March 8, 1938. R. P. HOLLAND, JR 2,110,730
STALL INDICATOR
Filed Nov. 6, 1936
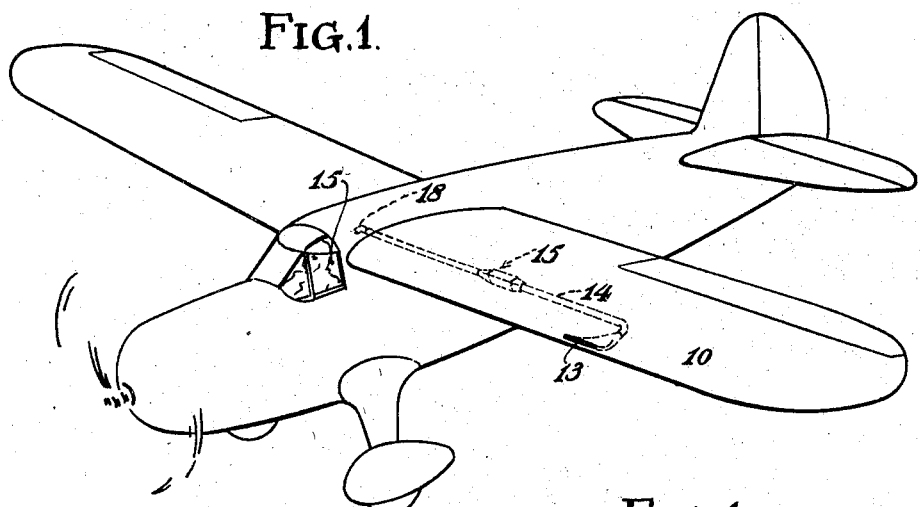
FIG.1.
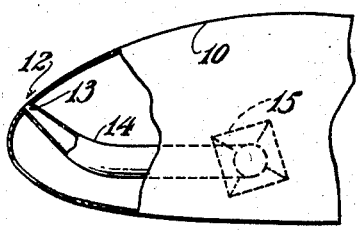
FIG.2.
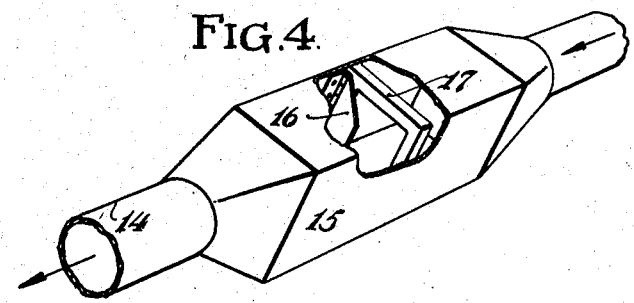
FIG.4.
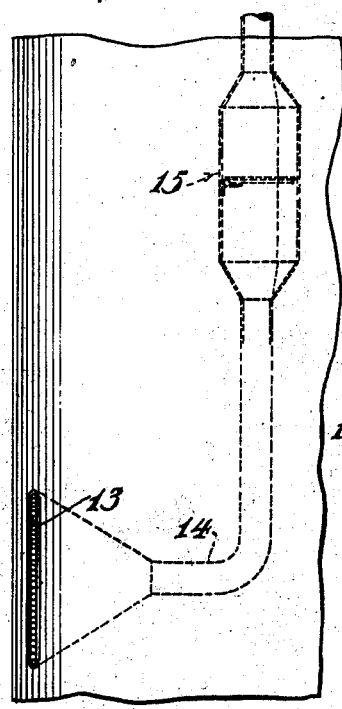
FIG.3.
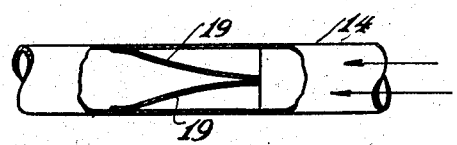
FIG.5.
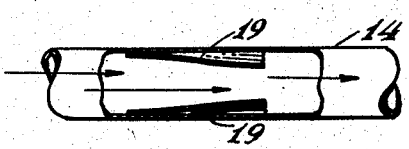
FIG.6.
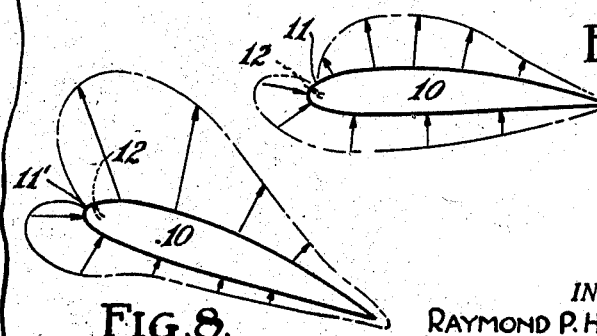
FIG.7.
FIG.8.
INVENTOR.
RAYMOND P. HOLLAND JR.
BY
ATTORNEY.

Patented Mar. 8, 1938

2,110,730

UNITED STATES PATENT OFFICE 2,110,730

STALL INDICATOR

Raymond P. Holland, Jr., Kenmore, N. Y., assignor to Curtiss-Wright Corporation, a corporation of New York Application November 6, 1936, Serial No. 109,423

7 Claims. (Cl. 244—1)

This invention relates to aircraft instruments and is particularly concerned with the provision of an automatic device for warning the aircraft crew when the aircraft may be in dangerous flight attitudes.

In the maneuvering of aircraft, a position may be reached which is known as a "stall" which essentially comprises the aircraft reaching such a high angle of attack with respect to the air stream that the lift of the wings falls off rapidly. Normally, the aircraft crew attempts to maintain aircraft at such a low angle of attack that the stalling position will never be reached, but in certain maneuvers, such as take-off and landing it is essential that the aircraft be placed in attitudes involving a high angle of attack in order to obtain maximum lift from the wings. Since only a small increase in angle of attack is necessary to shift from a high lift position to a stalled position where the lift is very low, it is highly desirable to provide some means which will warn the aircraft crew immediately when the angle of attack becomes critical.

An object of this invention is to provide automatic means dependent for its functioning upon the approach of the aircraft toward a stalling attitude.

A further object is to provide a slot in the wing leading edge of an aircraft which is subject to positive or negative pressure in accordance with the angle of attack of the wing.

A further object is to provide aural signalling means responsive to suction created at the aforementioned slot by reason of a negative pressure existing thereat under wing high angle of attack conditions.

Still another object is to provide valve means whereby airflow through the aforementioned slot may be confined to outward flow when the wing is in a high angle of attack attitude.

In the conventional aircraft wing, in flight, the air pressure distribution is such that a positive pressure area obtains at the nose part and under surface of the wing whereas a negative pressure condition exists on the upper part of the wing and on the upper part of the nose of the wing. There is one point which shifts along the upper part of the wing nose in accordance with high angle of attack conditions whereat the air pressure is zero (using normal atmospheric pressure as the datum zero). Under high angle of attack conditions, this zero point shifts forwardly, and under low angle of attack conditions it shifts rearwardly. This shift in the zero pressure zone is utilized in this invention to provide a stall warning indicator to the pilot. The particular device and mechanism for the accomplishment of the invention are hereafter described in detail and are shown in the annexed drawing in which:

Fig. 1 is a perspective view of an aircraft in flight incorporating the provisions of the invention.

Fig. 2 is a partial section through a wing leading edge showing part of the stall indicator.

Fig. 3 is a fragmentary plan of a wing including the device of the invention.

Fig. 4 is a perspective view of a valve suitable for use with the invention.

Figs. 5 and 6 are fragmentary views of the air conduit utilized in the invention, showing an alternative form of valve respectively in a closed and open position, and Figs. 7 and 8 are diagrammatic sections of an airfoil including pressure distribution curves thereon respectively in the low and high angle of attack positions.

Referring to Figs. 7 and 8, a conventional airfoil 10 is shown respectively in low and high angle of attack positions. In Fig. 7 it will be noted that a positive pressure region exists on the lower section of the nose and airfoil, while on the upper surface of the wing a low pressure region exists, this pressure being lower than atmospheric. At a point 11, on the upper nose portion of the wing, the pressure shifts from positive to negative whereby at that point atmospheric pressure will obtain. In Fig. 8, where the airfoil is in a high angle of attack position the point of zero or atmospheric pressure designated as 11' has moved forwardly. It will thus be seen that there is a point 12 between the points 11 and 11' which is subject to positive or negative pressure in accordance with the angle of attack of the wing. In this invention I provide an elongated opening 13 at the point 12 which communicates with the conduit 14 extending through the wing and into the crew compartment 15. In the conduit 14 I provide a one-way valve 15 shown in Fig. 4 which comprises a hinged door 16 capable of moving toward or away from a seat 17, the door 16 being so arranged that it may open the conduit 14 if there is a tendency for air to flow from the cockpit 14 toward the slot 13. If the airflow tendency is in the reverse direction, the door 16 will close preventing such airflow. At the cockpit end of the conduit 14 I provide some form of indicating device which in the present embodiment comprises a simple air operated whistle 18.

The operation of the device is as follows:

If the aircraft is flying at low angle of attack attitude, as in Fig. 7, positive pressure will exist at the opening 13, whereby air would tend to flow therefrom toward the cockpit 15 through the duct 14. The valve 15 under this condition closes, to prevent such flow. If the aircraft is maneuvering toward a stalling attitude as in Fig. 8, the opening 13 is moved to a region of less than atmospheric pressure. Consequently, since atmospheric pressure exists in the pilot's cockpit, air will flow from the whistle 18 through the conduit 14 and out through the opening 13, such airflow opening the valve 15 and causing the whistle 18 to give an aural signal which immediately warns the pilot that he is approaching a stalling condition of the wing. Obviously, the opening 13 will be located at a position on the nose of the wing to cause a warning signal to the pilot before the stalling angle is actually reached, so that the aircraft crew will have an opportunity to correct the aircraft attitude before lift is reduced.

In Figs. 5 and 6 I show an alternative form of valve in the conduit 14, the valve elements comprising resilient pockets 19 which normally tend to close the conduit for the prevention of airflow therethrough. If higher pressure exists on the right hand side of the pockets 19 as shown in the figures, the pockets will seal the conduit from airflow. If the airflow tendency is from the left as shown in Fig. 6 the pockets will be collapsed against the sides of the conduit and airflow will obtain as desired.

Although in the present embodiment of the invention I prefer to use a whistle 18, as described, the invention is not to be construed as limited to this form of signal. The tendency for airflow from the cabin toward the wing may be utilized to operate any other form of signal which might be deemed desirable.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. In aircraft including crew quarters and a wing having a zone at the leading edge thereof subject to pressure greater or less than atmospheric in accordance with the wing angle of attack, a conduit within said wing and opening to the atmosphere at said zone, said conduit extending to said quarters, a check valve in said conduit permitting airflow only from said quarters toward the wing opening, and aural signalling means operated by airflow in said conduit at the crew quarters end of said conduit.

2. In aircraft including a wing having a zone at the leading edge thereof subject to pressure greater or less than atmospheric in accordance with the wing angle of attack, signalling means for warning of high angle of attack including a device in said zone and means responsive to the presence of pressure less than atmospheric at said device for signalling the aircraft crew.

3. In aircraft, a wing having an opening at the upper part of the leading edge thereof, a conduit within said wing connecting with said opening, signal means associated with said conduit operated by airflow therethrough, and means for limiting airflow in said conduit to a single direction.

4. In aircraft including a member having a zone subject to less than atmospheric or more than atmospheric pressure according to the aircraft angle of attack, signalling means, and means responsive only to the pressure less than atmospheric pressure at said zone for operating said signalling means.

5. In aircraft including a member having a zone subject to less than atmospheric or more than atmospheric pressure according to the angle of attack of the aircraft, airflow operated signalling means, and means responsive to less than atmospheric pressure at said zone for establishing airflow for the operation of said signalling means.

6. In aircraft including a member having a zone subject to pressure change between more than atmospheric and less than atmospheric thereon in accordance with the aircraft angle of attack, an indicator, and means responsive to pressure less than atmospheric at said zone for operating said indicator.

7. In aircraft including a member having a zone subject to pressure changes between more than atmospheric and less than atmospheric thereon in accordance with the aircraft angle of attack, means subject to pressure differences occurring at said zone, and an indicator connected with said means and responsive in its indication to pressure less than atmospheric at said zone.

RAYMOND P. HOLLAND, Jr.